(12) United States Patent
Daniels et al.

(10) Patent No.: US 8,978,594 B2
(45) Date of Patent: Mar. 17, 2015

(54) RETRACTABLE PET LEASH

(71) Applicant: Pet Projx, LLC, New York, NY (US)

(72) Inventors: Jason Daniels, New York, NY (US); Arsenio Garcia Monsalve, Brooklyn, NY (US)

(73) Assignee: Pet Projx, LLC, New York, NY (US)

( * ) Notice: Subject to any disclaimer, the term of this patent is extended or adjusted under 35 U.S.C. 154(b) by 0 days.

(21) Appl. No.: 13/781,511

(22) Filed: Feb. 28, 2013

(65) Prior Publication Data

US 2014/0238313 A1  Aug. 28, 2014

(51) Int. Cl.
*A01K 27/00* (2006.01)

(52) U.S. Cl.
CPC .................. *A01K 27/004* (2013.01)
USPC ............ 119/796; 119/795; 119/797; 119/798

(58) Field of Classification Search
USPC .................. 119/795, 796, 797, 798
See application file for complete search history.

(56) References Cited

U.S. PATENT DOCUMENTS

| | | | |
|---|---|---|---|
| D128,606 S | 8/1941 | Stickell et al. | |
| 2,833,250 A | 5/1958 | Beebe | |
| 2,919,676 A | 1/1960 | Schneider | |
| 3,198,175 A | 8/1965 | Dean | |
| 3,937,418 A | 2/1976 | Critelli | |
| 4,402,472 A | 9/1983 | Burtscher | |
| 4,657,201 A * | 4/1987 | Munroe | 242/265 |
| 4,936,479 A | 6/1990 | Levy et al. | |
| 5,107,083 A * | 4/1992 | Yagi | 200/341 |
| D337,866 S | 7/1993 | Wiens | |
| 5,230,480 A | 7/1993 | Perry | |
| D341,682 S | 11/1993 | Musetti | |
| 5,377,626 A | 1/1995 | Kilsby et al. | |
| D379,689 S | 6/1997 | Levine et al. | |
| 5,890,456 A | 4/1999 | Tancrede | |
| D410,117 S | 5/1999 | Ball et al. | |
| 6,240,881 B1 | 6/2001 | Edwards et al. | |
| D448,892 S | 10/2001 | Hans | |
| D469,125 S | 1/2003 | Jacquet | |
| 6,526,918 B1 | 3/2003 | Arnold | |
| 6,792,893 B1 * | 9/2004 | Quintero et al. | 119/796 |
| 6,845,736 B1 | 1/2005 | Anderson | |
| 6,845,737 B1 | 1/2005 | Austin | |
| 6,904,872 B2 * | 6/2005 | Muller | 119/796 |

(Continued)

FOREIGN PATENT DOCUMENTS

| | | |
|---|---|---|
| DE | 1959153 | 5/1971 |
| GB | 2467434 A | 8/2010 |

(Continued)

*Primary Examiner* — Monica Williams
*Assistant Examiner* — Michael Wang
(74) *Attorney, Agent, or Firm* — Venable LLP

(57) ABSTRACT

A retractable pet leash such as, for example, for dogs, is provided. The retractable pet leash includes a hollow housing configured to be held by a hand of a user. A spool member may be disposed within the housing and arranged to rotate about an axis to release or retract an elongated leash element wrapped about the spool member. The spool member may be rotatably biased to retract the leash element within the housing. At least one grippable pressure element may be disposed on the housing to releasably engage the spool to slow and/or stop rotation of the spool when the user squeezes the housing. The elongated leash element may have an attachment portion at an end thereof to be coupled to a collar or harness on an animal.

13 Claims, 8 Drawing Sheets

(56) References Cited

U.S. PATENT DOCUMENTS

| | | |
|---|---|---|
| D541,489 S | 4/2007 | Johnson et al. |
| D553,307 S | 10/2007 | Ko |
| D560,522 S | 1/2008 | Farnworth et al. |
| D568,692 S | 5/2008 | Lam |
| D571,405 S | 6/2008 | Boulais |
| 7,461,615 B2 | 12/2008 | Albright |
| D590,444 S | 4/2009 | Farnworth et al. |
| D596,356 S | 7/2009 | Danieli |
| D610,315 S | 2/2010 | Lopusnak et al. |
| D610,752 S | 2/2010 | Roediger |
| D613,002 S | 3/2010 | Lopusnak et al. |
| D621,562 S | 8/2010 | Marshall |
| D640,426 S | 6/2011 | Okumura et al. |
| 7,980,202 B2 | 7/2011 | Bentz et al. |
| D643,161 S | 8/2011 | Leedom et al. |
| D651,366 S | 12/2011 | Fisher et al. |
| 8,201,964 B2 * | 6/2012 | Mattheis ................ 362/184 |
| 8,230,822 B2 | 7/2012 | Smith |
| 8,256,385 B2 * | 9/2012 | Goldenberg ............ 119/796 |
| 2006/0070584 A1 * | 4/2006 | Larouche ................ 119/795 |
| 2006/0207522 A1 | 9/2006 | Perkitny |
| 2009/0120376 A1 | 5/2009 | Foster |
| 2009/0178627 A1 | 7/2009 | Bentz et al. |
| 2009/0217886 A1 | 9/2009 | Lopusnak et al. |
| 2010/0037832 A1 * | 2/2010 | Smith ................ 119/796 |
| 2010/0107992 A1 * | 5/2010 | Chefetz ................ 119/796 |
| 2010/0243783 A1 | 9/2010 | Hermann, II |
| 2010/0326371 A1 * | 12/2010 | Lopusnak et al. ........ 119/796 |
| 2011/0023794 A1 | 2/2011 | Smith |
| 2011/0114032 A1 | 5/2011 | Reed |
| 2011/0139090 A1 | 6/2011 | Harruna |
| 2011/0197820 A1 | 8/2011 | Goldy et al. |
| 2011/0220036 A1 * | 9/2011 | Matthews ............. 119/796 |
| 2012/0006284 A1 | 1/2012 | Messner |

FOREIGN PATENT DOCUMENTS

| | | |
|---|---|---|
| JP | 2009-136213 | 6/2009 |
| WO | WO-2011/107833 | 9/2011 |

\* cited by examiner

RETRACTABLE PET LEASH

CROSS-REFERENCE TO RELATED APPLICATIONS

None.

BACKGROUND

1. Field of Invention

The invention relates generally to retractable pet leashes and, more particularly, to an improved retractable pet leash.

2. Related Art

According to a 2011-2012 pet owners survey conducted by the American Pet Products Association, there are approximately 78.2 million owned dogs in the United States. Thirty-nine percent of U.S. households apparently own at least one dog. Most dog owners walk their dog on a regular basis, e.g., daily, and typically utilize a leash in order to control the dog in public.

Many available leashes are retractable/extendable in nature, thus allowing the user to manually control the length of the leash during use. Such leashes typically include a housing having a handle and a mechanism such as a push button or trigger operable by the user to control the released length of the leash. Available leashes, however, often are not ergonomic nor are they designed to have improved function based on natural user reaction to actions of the animal.

SUMMARY

What is needed is an improved retractable pet leash.

In accordance with an embodiment of the invention, an improved retractable pet leash is provided such as, for example, for dogs. The retractable pet leash includes a hollow housing configured to be held by a hand of a user. A spool member may be disposed within the housing and arranged to rotate about an axis to release or retract an elongated leash element wrapped about the spool member. The spool member may be rotatably biased to retract the leash element within the housing. At least one grippable pressure element may be disposed on the housing to releasably engage the spool to slow and/or stop rotation of the spool when the user squeezes the housing. The elongated leash element may have an attachment portion at an end thereof to be coupled to a collar or harness on an animal.

In accordance with another embodiment of the invention, a retractable pet leash is provided. The pet leash may include a squeezable hollow housing configured to be held in a hand of a user, an elongated leash element having an attachment portion at an end thereof configured to be coupled to a collar or harness on an animal, and a spool disposed within the housing and rotatably biased to retract the leash element within the housing. The spool may be positioned within the housing such that rotation of the spool is slowed and/or stopped when the user squeezes the housing.

Further features and advantages, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of some embodiments of the invention, as illustrated in the accompanying drawings. Unless otherwise indicated, the accompanying drawing figures are not to scale. Several embodiments of the invention will be described with respect to the following drawings, in which like reference numerals represent like features throughout the figures, and in which.

DETAILED DESCRIPTION

Some embodiments of the invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the invention.

Figure 1:
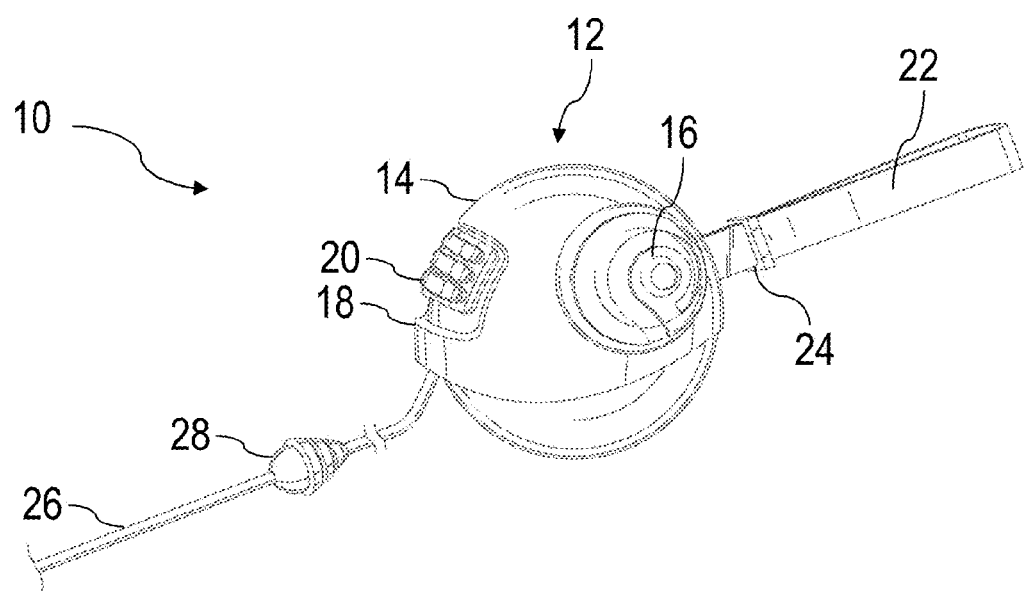
FIG. 1 is a perspective view of a retractable pet leash according to an embodiment of the invention.
Figure 2:
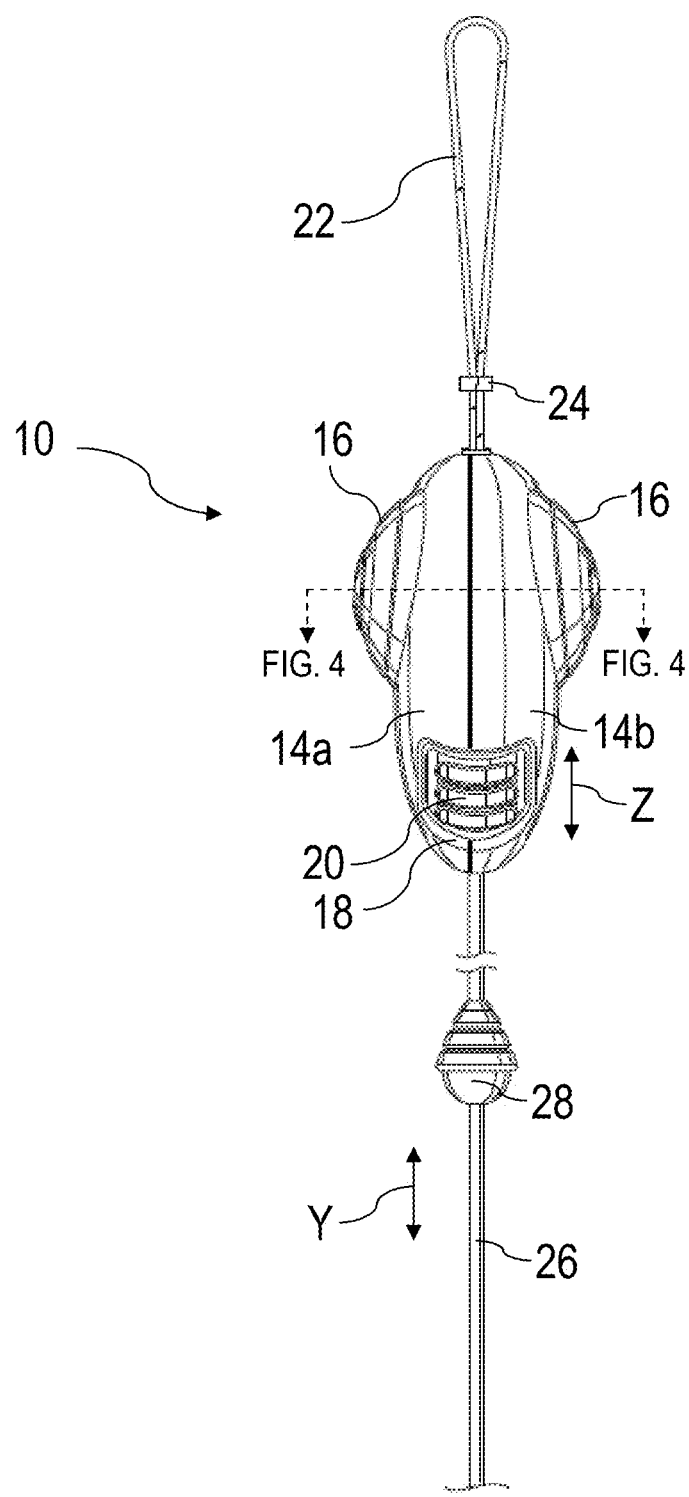
FIG. 2 is an illustrative top view of the retractable pet leash of FIG. 1.

FIG. 1 is a perspective view of a retractable pet leash 10 according to an embodiment of the invention. FIG. 2 is an illustrative top view of the retractable pet leash 10 of FIG. 1. As shown in FIGS. 1 and 2, the retractable pet leash 10 includes a housing assembly 12 including a hollow housing 14 and at least one grippable pressure element 16 disposed on the hollow housing 14. For example, the grippable pressure element 16 may include two pressure elements 16, each disposed on a respective side of the housing 14. In the embodiment shown, the pressure elements 16 may include bulbous members protruding from respective sides of the housing 14. The pressure elements 16 are configured to be gripped by a hand of a user and to releasably engage an internal spool (not shown) to slow and/or stop rotation of the spool when the user squeezes the housing 14 as further described below with reference to FIGS. 3-7. A locking element 20, for example in the form of a sliding lock member, may be disposed on the housing 14 in a slot 18 for activation by the user to releasably lock rotation of an internal spool (see FIGS. 4-7). An elongated leash element 26 extends from the housing 14 for attachment to, for example, a collar or harness on an animal. The elongated leash element 26 is arranged to retractably extend from the housing 14 as indicated by bi-directional arrow Y in FIG. 2. A wrist strap 22 may be coupled to the housing 14 for placement around the wrist of the user during use for added security. The wrist strap 22 may be formed of any suitable natural or synthetic material such as, for example but not limited to, nylon, leather, plastic, or any combination thereof. The wrist strap 22 may include a wrist strap adjustment element 24 such as an adjustable loop or toggle to adjust the size of the wrist strap 22 and thereby secure the strap 22 about the user's wrist. A grippable knob element 28 may be connected at an intermediate position along the length of leash element 26 and may be utilized by the user to pull the dog when standing close, for example. Knob element 28 may also serve as a stop device to prevent further retraction of the leash element 26 within the housing 14.

As shown in FIG. 2, the hollow housing 14 may be composed of two housing halves 14a, 14b coupled together to form the housing 14. Housing 14 may be formed from any suitable material such as, for example, injection molded plastic, metal, or composite material. Grippable pressure elements 16 may be formed integrally with housing halves 14a, 14b or may be separately formed and later connected to the housing 14. Grippable pressure elements 16 may be formed from any suitable material such as, for example, a flexible plastic, rubber, or composite material and may be contoured or include other surface features to provide added gripping ability for the user. In some embodiments, the elongated leash element 26 may comprise one of a flexible fabric (e.g., nylon), a rope, a cable, or a chain.

Figure 3:
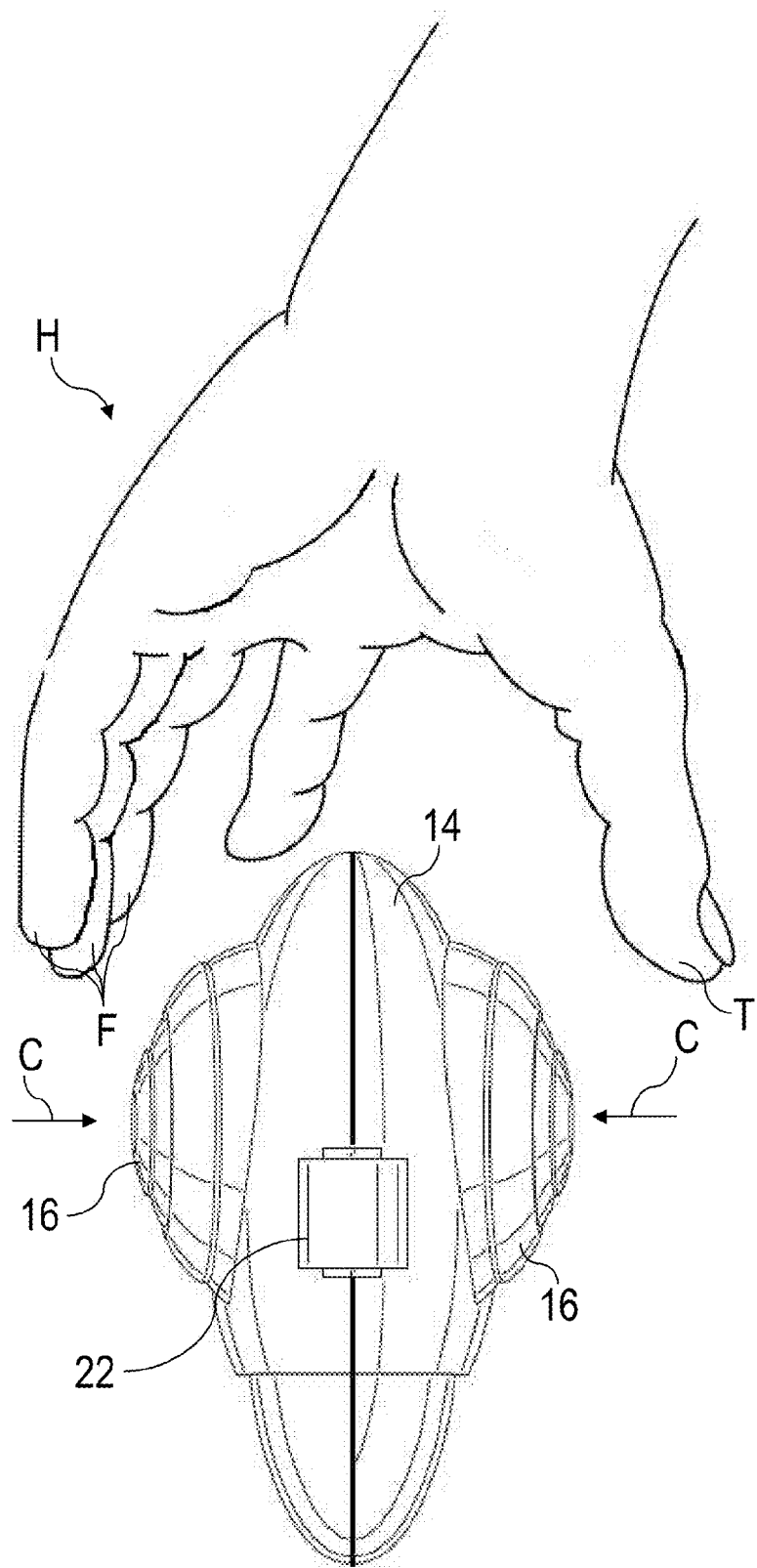
FIG. 3 is a rear view of the retractable pet leash depicted in FIGS. 1 and 2 shown about to be received in a hand of a user.

FIG. 3 is a rear view of the retractable pet leash 10 depicted in FIGS. 1 and 2 shown about to be received in a hand H of a user U for use. The housing 14 may be received in hand H, for example, such that the top of the housing 14 is positioned in the palm of the user's hand H and the grippable pressure elements 16 are contacted by the user's thumb T on one side and one or more of the user's fingers F on the other side. Alternatively, depending on user preference and comfort, the housing 14 may be received in the user's hand H at different positions, orientations, and angles (not shown); hence, operation of the grippable pressure element 16 may be effected by varying portions of the user's hand H including fingers F, thumb T, and/or portions of the palm. Although not shown in FIG. 3, the user's hand H may also be inserted through wrist strap 22. In use, the leash element 26 (not shown in FIG. 3) extends into the page and user U may control the extension and retraction of the leash element 26 relative to the housing 14 by squeezing the housing 14 and the grippable pressure elements 16 in direction C. The user U may also, for example, manipulate the locking element (not shown in FIG. 3) using his or her index finger or thumb T depending on how housing 14 is positioned in and being held by hand H of the user U.

Figure 4:
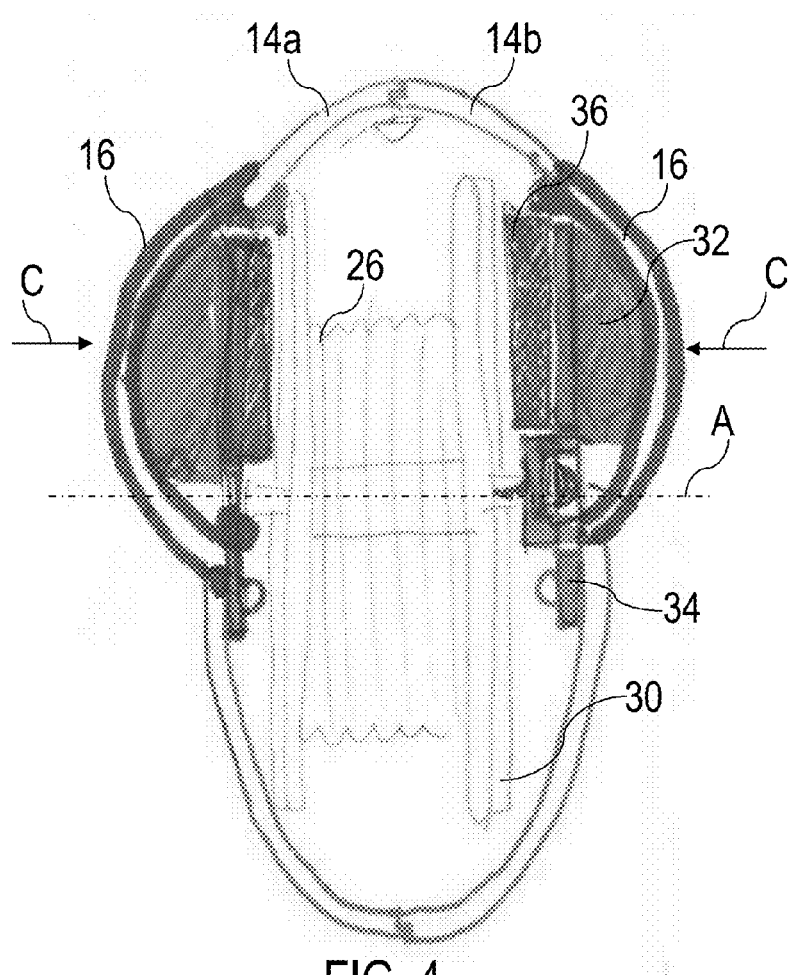
FIG. 4 is a cross-sectional view of the retractable pet leash depicted in FIG. 1.

FIG. 4 is a cross-sectional view of the retractable pet leash 10 depicted in FIGS. 1 and 2. The cross-section is taken along line FIG. 4—FIG. 4 in FIG. 2. As shown in FIG. 4, housing halves 14a, 14b may each include one of the opposing grippable pressure elements 16. A spool 30 is rotatably disposed within the housing 14 for rotation about axis A. The leash element 26 is shown wrapped about a central axle of spool 30. The spool 30 may be biased to rotate about axis A in a direction to withdraw or retract the leash element 26 within the housing 14. Such biased rotation may be provided by any known mechanism such as, for example but not limited to, a torsion spring or the like. The pressure element 16 may be positioned to contact and engage an outer axial side of the spool 30 when the pressure element 16 is squeezed by the user to induce a force in direction C. The pressure element 16 may include, for example, an inner pad member 32 and a brake element 36 supported internally via a support element 34. When the pressure element 16 is squeezed in direction C, inner pad member 32 is pushed inwardly toward the spool 30 to force the brake element 36 into contact with the spool 30 and thereby slow and/or stop rotation of the spool 30 to control extension or retraction of the leash element 26 out of or into the housing 14. The support element 34 may be, for example, a plate element rigidly coupled to the housing 14 at one end and coupled to the inner pad member 32 and a brake element 36 at the other free end. In this way, the free end of the support element 34 may be biased inwardly under force C when the pressure element 16 is squeezed by the user to allow brake element 36 to contract the spool 30 and thereby slow or stop rotation thereof. The pressure element 16, including inner pad member 32 support element 34, and brake element 36 may be provided on only one half of the housing 14 or, alternatively, on both halves 14a, 14b.

Figure 5:
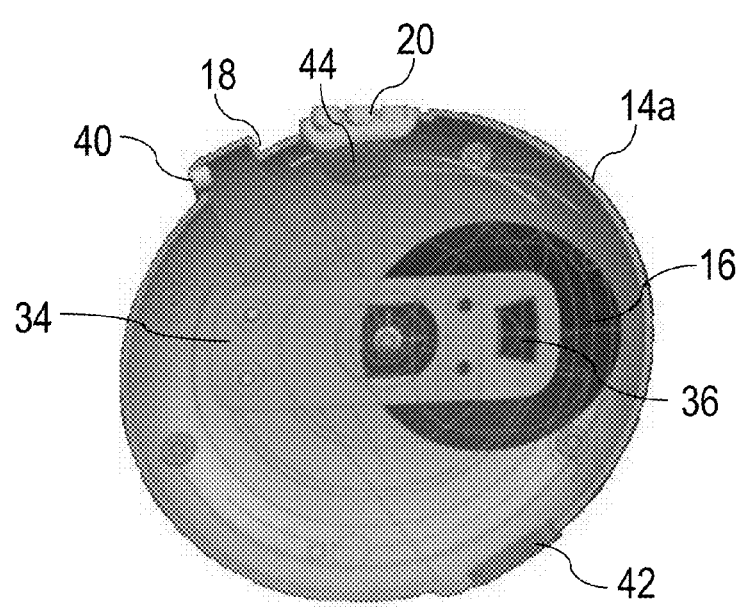
FIG. 5 is a perspective view of a portion of the retractable pet leash of FIG. 1 including a pressure element and a locking element according to an embodiment of the invention.

FIG. 5 is a perspective interior view of one of the housing halves 14a of the retractable pet leash 10 of FIG. 1. As shown in FIG. 5, the housing half 14a may include an outlet 40 for passage of the leash element 26 and a wrist strap attachment point 42. The pressure element 16 is shown positioned in a side of the housing half 14a and support member 34 is shown attached at one end to the housing half 14a. The opposite end of the support member 34 is positioned adjacent to the pressure element 36 and is shown coupled to brake element 36. A central portion of support member 34 is depicted as having a cutout to allow passage of a central rod upon which the spool 30 is rotatably mounted. Additionally shown in FIG. 5 is the slot 18 defined in an outer portion of the housing half 14a and having locking element 20 slidably received therein. The locking element 20 may have a cam surface 44 for engagement with the spool 30 as described further below with reference to FIGS. 6 and 7.

Figure 6:
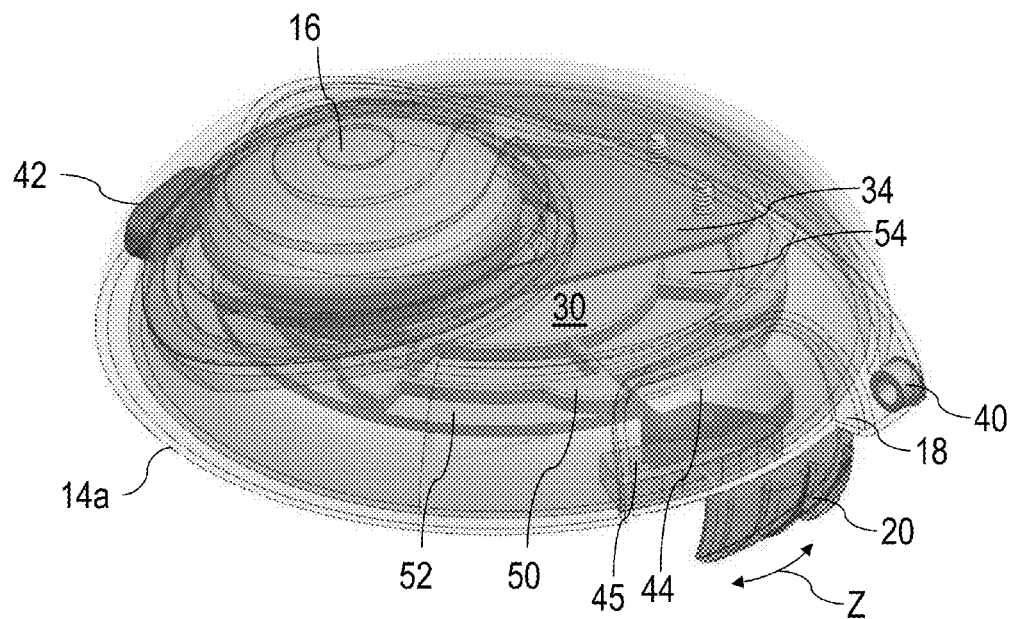
FIG. 6 is a partial perspective view of the retractable pet leash of FIG. 1 showing an internal spool and the pressure element and locking element.

FIG. 6 is a partial perspective view of the housing half 14a of the retractable pet leash 10 of FIG. 5 showing the internal spool 30, the pressure element 16, and locking element 20. The pressure element 16 is shown positioned in a side of the housing half 14a and support member 34 is shown attached at one end to the housing half 14a. The opposite end of the support member 34 is positioned adjacent to the pressure element 36 and is coupled to brake element (not shown in FIG. 6). The spool 30 may include recesses 54 on an axially outer surface 52 for engagement by the brake element 36 to slow and/or stop rotation of the spool 30. Recesses 54 could also be protrusions, a rough surface, smooth surface, or other features so long as engagement by the brake element 36 slows and/or stops rotation of the spool 30. As depicted in FIG. 6, the locking element 20 is shown slidably disposed in the slot 18. The locking element 20 may include a cam surface 45. When locking element 20 is moved bi-directionally as indicated arrow Z between locked and unlocked positions, the cam surface 45 may engage and disengage an internal locking member 44 such that internal locking member 44 is moved radially inwardly to contact spool stop elements 50 disposed around a radially outward circumference of spool 30 and thereby prevent rotation of the spool 30. The internal locking member 44 may be biased radially outwardly so as not to interfere with rotation of the spool 30 when the locking element 20 is in an unlocked position.

Figure 7:
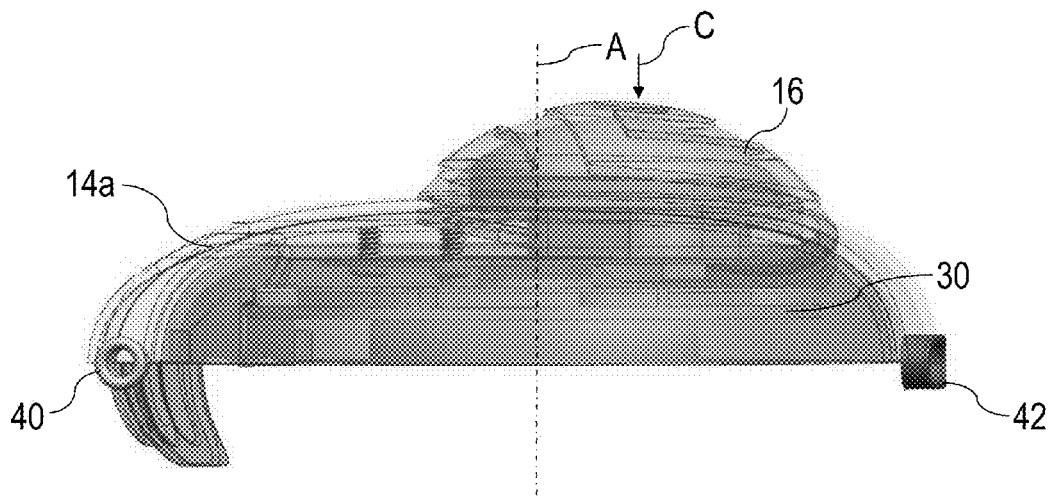
FIG. 7 is a partial bottom view of the retractable pet leash of FIG. 1 showing one side of the housing including the pressure element and the internal spool.

FIG. 7 is a partial bottom view of the housing half 14a of the retractable pet leash 10. As shown in FIG. 7, when a force directed along arrow C is applied to the at least one pressure element 16 disposed on a side of the housing 14, for example when the user squeezes the housing 14, the outer axial surface of the spool 30 is contacted by the brake element (not clearly shown in FIG. 7) to slow and/or stop rotation of the spool 30. According to the depicted embodiment, the direction of force C may be substantially parallel to the axis of rotation A of the spool 30.

Figure 8:
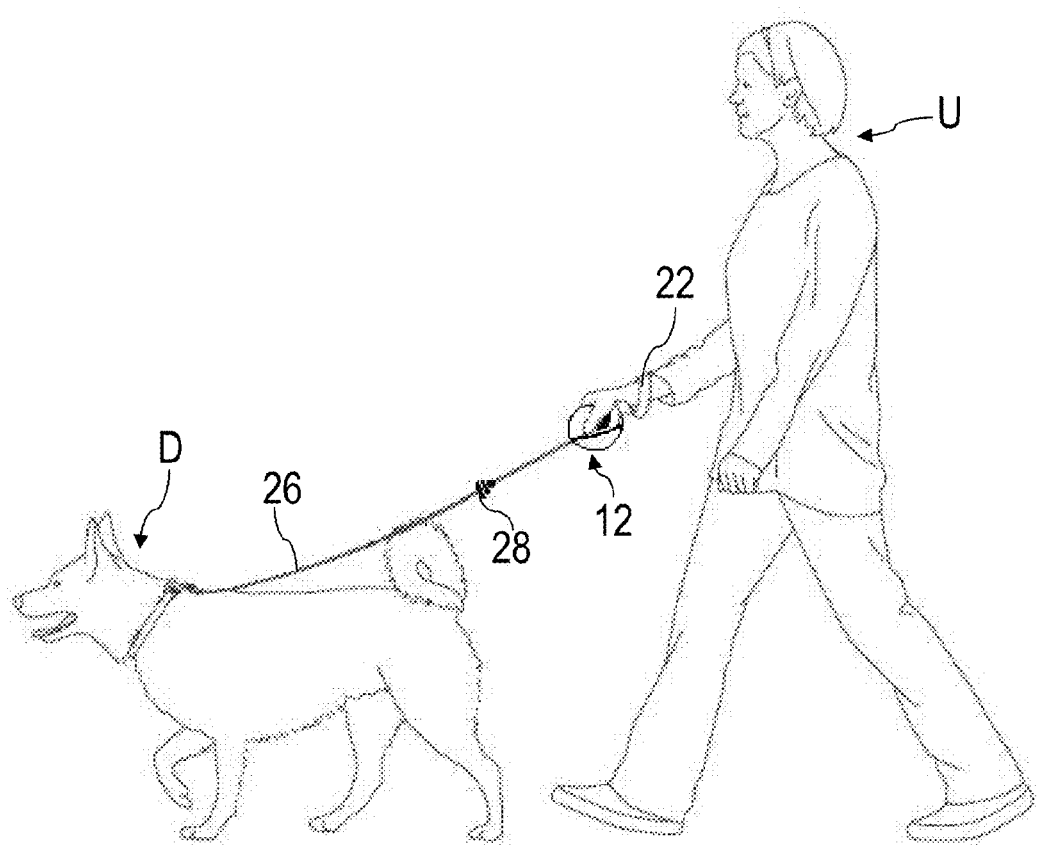
FIG. 8 is an illustrative view of the retractable pet leash of FIG. 1 in use.

FIG. 8 is an illustrative view of the retractable pet leash 10 of FIG. 1 in use. A user U may hold the housing assembly 12 of the retractable pet leash 10 in his/her hand. The wrist strap 22 may be secured around a wrist of the user U for added security. The leash element 26 may extend from the housing assembly 12 in the user's hand to a collar or harness of the user's pet, e.g., dog D. During use, the leash element 26 is released and retracted freely from the housing assembly 12 depending on the relative distance between the user U and dog D. User U may control the extended length of the leash element 26 by squeezing the housing 14 (see FIG. 3) to slow and/or stop rotation of the spool 30 (not shown) disposed therein. In order to positively lock the spool 30 against rotation without the need to squeeze the housing 14, the user U may optionally slide locking element 20 from an unlocked position to a locked position (not shown in FIG. 8). The user U may grab or otherwise utilize the grippable knob element 28 on the leash element 26 to hold or pull the dog D when standing close to the dog D.

The retractable pet leash 10 disclosed and shown herein may provide a hybrid of retractable and traditional leashes and may offer a more ergonomic design including, for example, a relaxed more comfortable grip, than previously known retractable leashes. The retractable pet leash 10 may be constructed and designed such that a larger proportion of the housing structure and its inherent weight is substantially received within the user's palm, e.g., within the natural arches of the human hand, rather than at a position away from or outside the user's hand which can create increased moments and stressful forces on the user's fingers. The housing 14 may be sized and constructed to provide a universal grip that fits most hand sizes. Alternatively, the housing 14 may be provided in a plurality of different sizes depending on, for example, hand size, leash length, and/or leash material. In some embodiments, positioning of the various features, in particular the at least one pressure element on the housing, may provide a so-called "reflex grip," such that the device responds to natural pulling action. For example, when dog D attempts to pull in a direction away from user U, a natural reaction of the user U may be to grip or squeeze the housing 12 more tightly, which in turn will slow and/or stop release of the leash element 26 from the housing 12. In some embodiments, the at least one pressure element could be placed in various positions around the housing for engagement with different surfaces and features of the spool. In some embodiments, the locking element may be oversized and/or accessible from both the top or side of the housing depending on how the leash is being held. In some embodiments, the locking element may be in the form of a depressible button.

Figure 9A:
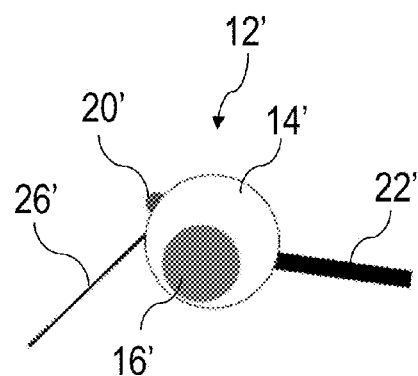
FIGS. 9A-9G depict illustrative side views of a retractable pet leash according to several alternative embodiments of the invention.
Figure 9B:
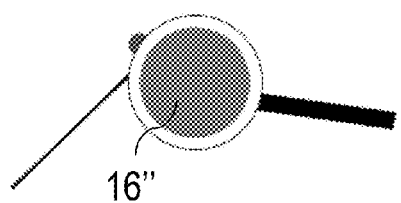
Figure 9C:
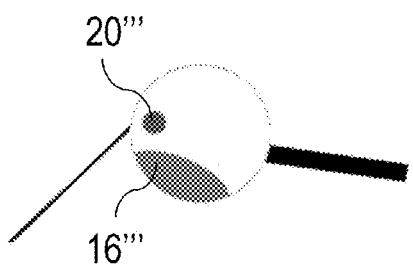

The example embodiment shown in FIGS. 1-8 depicts the housing 12 as being substantially circular or disk-shaped. The invention, however, is not limited to the depicted shape and could have other suitable configurations such as, for example but not limited to, elliptical, polygonal, rectangular, square, triangular, or any other suitable shape so long as the spool is rotatably received within the housing. Additionally, the relative positions of the grippable pressure element(s) and locking element may be altered. For example, in the embodiment schematically depicted in FIG. 9A, the housing assembly 12' includes grippable pressure element 16' provided on a side of the housing 14' towards a bottom thereof and a locking element 20' provided on a top/front portion of the housing 14'. A wrist strap 22', and leash element 22' are also depicted. In another embodiment schematically depicted in FIG. 9B, the grippable pressure element(s) 16" provided on the side of the housing may be centered and may constitute a majority of the surface area on the side of the housing. In another illustrative embodiment shown in FIG. 9C, the grippable pressure element(s) 16'" may be provided on a bottom of the housing. Locking element 20'" may be provided on a side of the housing.

Figure 9D:
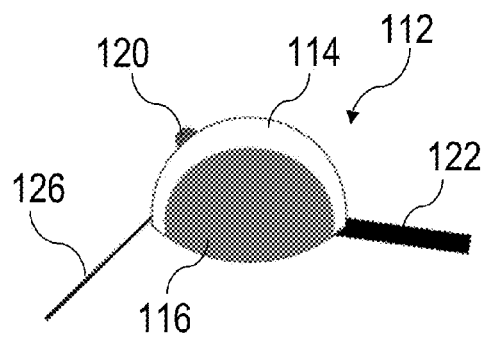
Figure 9E:
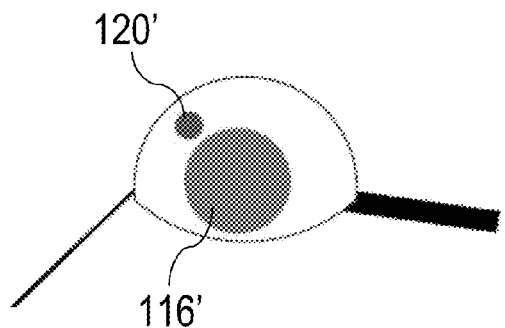

In embodiments shown in FIGS. 9D and 9E, the housing assembly 112 may having a housing 114 substantially in the shape of a taco shell, such that a user gripping the housing 114 may squeeze grippable pressure element(s) 116 on opposing sides of the "taco" toward one another to slow and/or stop rotation of the spool disposed therein. The locking element 120 may be provided on a top of the housing 114 although other positions are possible such as, for example, on the side of the housing as shown in FIG. 9E. As can be seen in FIG. 9E, the grippable pressure element(s) 116' and locking element 120' may both be provided on the side of the housing.

Figure 9F:
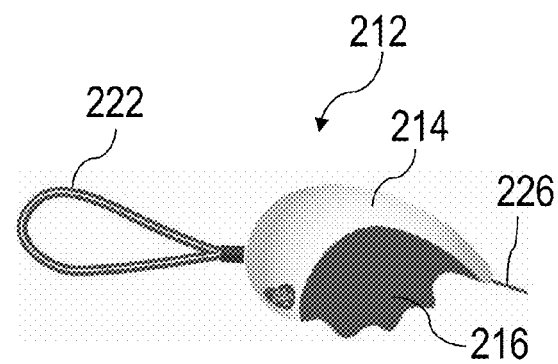
Figure 9G:
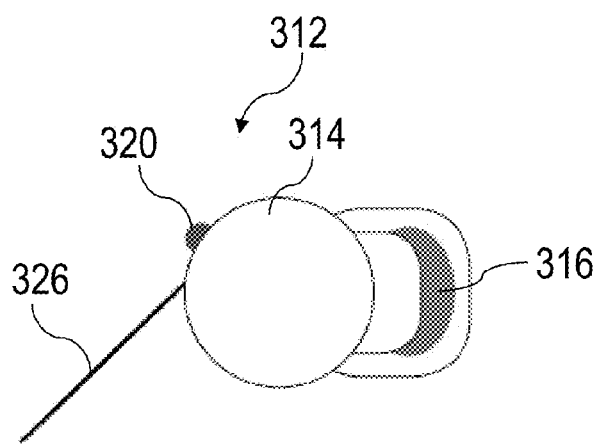

In still another embodiment depicted in FIG. 9F, the housing assembly 212 may include a grippable pressure element 216 positioned at a bottom-front of the housing 214. The grippable pressure element 216 may include a ridged finger-receiving portion. In yet another embodiment, depicted in FIG. 9G, the housing assembly 312 may include a grippable pressure element 316 provided in an integrally formed handle portion of housing 314 and arranged to be engaged and squeezed by the user's fingers when gripping the handle portion. Locking element 316 may be provided at any convenience position on the housing 314.

One of ordinary skill in the art will recognize that other shapes and configurations of the housing as well as the relative positions and configurations of the grippable pressure element(s) and locking element thereon are possible without departing from the features of the claimed invention. FIGS. 9A-9G depict other exemplary embodiments of the retractable leash illustrating different configurations of the housing, grippable pressure elements (shaded portions), and/or locking element and are not intended to be limiting.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A retractable pet leash, comprising:
    a hollow housing sized and configured to be held in a hand of a user;
    an elongated leash element having an attachment portion at an end thereof configured to be coupled to a collar or harness on an animal;
    a spool member disposed within the housing and arranged to rotate about an axis to release or retract the leash element wrapped about the spool member, wherein the spool member is rotatably biased to retract the leash element within the housing; and
    at least one grippable pressure element disposed on the housing, the at least one grippable pressure element comprising a flexible material, wherein the at least one pressure element is arranged to releasably engage the spool to slow and/or stop rotation of the spool when the user squeezes the housing,
    wherein the at least one grippable pressure element comprises two pressure elements disposed on respective sides of the housing, and each of the two pressure elements are configured to actuate in a direction parallel to the axis of the spool.

2. The retractable pet leash according to claim 1, wherein the at least one pressure element is disposed on a side of the housing.

3. The retractable pet leash according to claim 1, wherein each pressure element comprises a bulbous member protruding from the respective side of the housing and configured to be gripped by the hand of the user.

4. The retractable pet leash according to claim 1, wherein the at least one pressure element comprises an inner pad, a brake element, and a support element.

5. The retractable pet leash according to claim 1, wherein the at least one pressure element is biased outwardly away from the spool.

6. The retractable pet leash according to claim 1, wherein a portion of the at least one pressure element is arranged to be releasably received in a recess provided on an axially outer side of the spool.

7. The retractable pet leash according to claim 1, further comprising a locking element arranged on the housing and configured to releasably engage the spool to prevent rotation thereof, wherein the locking element is movable between a first released position and a second locked position.

8. The retractable pet leash according to claim 7, wherein the locking element is slidably arranged in a slot on the housing, and wherein the locking element comprises a sliding cam mechanism.

9. The retractable pet leash of claim 8, wherein the locking element and slot are disposed on a top of the housing, and wherein when the locking element is in the second locked position the sliding cam mechanism engages a radially outer portion of the spool.

10. The retractable pet leash according to claim 1, further comprising:
a grippable knob element disposed along the elongated leash element.

11. The retractable pet leash according to claim 1, wherein the elongated leash element comprises one of a flexible fabric, rope, cable, or chain.

12. The retractable pet leash according to claim 1, further comprising a wrist strap connected to the housing.

13. A retractable pet leash, comprising:
a squeezable hollow housing configured to be held in a hand of a user, the squeezable hollow housing comprising a flexible material;
an elongated leash element having an attachment portion at an end thereof configured to be coupled to a collar or harness on an animal; and
a spool disposed within the housing and rotatably biased to retract the leash element within the housing, wherein the spool rotates about an axis and is positioned within the housing such that rotation of the spool is slowed at least in part by a deformation of the flexible material on respective sides of the squeezable hollow housing when the user squeezes the squeezable hollow housing,
wherein the squeezable hollow housing is configured to actuate in a direction parallel to the axis of the spool when the user squeezes the squeezable hollow housing.

* * * * *